US012241653B2

(12) United States Patent
Chapin et al.

(10) Patent No.: US 12,241,653 B2
(45) Date of Patent: Mar. 4, 2025

(54) DEHUMIDIFIER WITHOUT CONDENSATE TANK

(71) Applicant: Midea Group Co., Ltd., Foshan (CN)

(72) Inventors: Zachary Chapin, Louisville, KY (US); Adam Schultz, Prospect, KY (US); David Leezer, LaGrange, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 93 days.

(21) Appl. No.: 17/692,648

(22) Filed: Mar. 11, 2022

(65) Prior Publication Data

US 2022/0290876 A1  Sep. 15, 2022

Related U.S. Application Data

(60) Provisional application No. 63/159,796, filed on Mar. 11, 2021.

(51) Int. Cl.

| | | |
|---|---|---|
| *F24F 3/14* | (2006.01) | |
| *B01D 5/00* | (2006.01) | |
| *F24F 1/0358* | (2019.01) | |
| *F24F 11/30* | (2018.01) | |
| *F24F 11/61* | (2018.01) | |
| *F24F 11/63* | (2018.01) | |

(Continued)

(52) U.S. Cl.
CPC ............. *F24F 3/14* (2013.01); *B01D 5/0027* (2013.01); *F24F 1/0358* (2019.02); *F24F 11/30* (2018.01); *F24F 11/61* (2018.01); *F24F 11/63* (2018.01); *F24F 11/89* (2018.01); *F24F 13/222* (2013.01); *F24F 2003/1446* (2013.01); *F24F 2140/30* (2018.01)

(58) Field of Classification Search
CPC ........ F24F 11/30; F24F 11/89; F24F 11/0358; F24F 13/222
See application file for complete search history.

(56) References Cited

U.S. PATENT DOCUMENTS 4,526,227 A * 7/1985 Baker ................... F24F 1/0047
454/236
5,699,049 A * 12/1997 Difiore .................... G01F 23/36
73/290 R (Continued)

FOREIGN PATENT DOCUMENTS

| CN | 202747574 U | 2/2013 |
| CN | 109425043 A | 3/2019 |

OTHER PUBLICATIONS

Belin, Belin Brand BL890D 90L (150Pint) R410a Without Water Tank Drainage Directly Commercial Industrial Dehumidifier, retrieved from: https://www.alibaba.com/product-detail/BELIN-brand-BL-890D-90L-150Pint_60447146179.html?spm=a2700.7724857.normal_offer.d_title.79fb5cd7iHcdoL, 7 pages, Retrieved on: Mar. 23, 2021.

(Continued)

*Primary Examiner* — Jonathan Bradford
(74) *Attorney, Agent, or Firm* — Gray Ice Higdon

(57) ABSTRACT

A dehumidifier without a condensate tank is provided. The dehumidifier may include a housing, one or more outlets, and no condensate tank. The dehumidifier may be positioned directly above a floor drain and/or a drain within a utility sink during operation. The dehumidifier may include a pump. The dehumidifier may include one or more sensors.

20 Claims, 7 Drawing Sheets

(51) Int. Cl.
*F24F 11/89* (2018.01)
*F24F 13/22* (2006.01)
*F24F 140/30* (2018.01)

(56) References Cited

U.S. PATENT DOCUMENTS

| | | | |
|---|---|---|---|
| 6,370,902 B1 | 4/2002 | De' Longhi | |
| 7,821,411 B1 | 10/2010 | Ward | |
| 8,181,939 B2 * | 5/2012 | Yoon | F24F 3/1405 |
| | | | 261/DIG. 65 |
| 8,869,548 B2 | 10/2014 | Piccione | |
| 10,458,730 B2 | 10/2019 | Lorang et al. | |
| 10,677,479 B2 | 6/2020 | Andersson | |
| 10,830,490 B2 | 11/2020 | Rokade et al. | |
| 10,900,676 B2 | 1/2021 | Swanson et al. | |
| 2003/0066298 A1 | 4/2003 | Yang | |
| 2017/0336093 A1 | 11/2017 | Huang et al. | |
| 2018/0195758 A1 * | 7/2018 | Hou | F25D 21/14 |
| 2019/0316793 A1 * | 10/2019 | Ho | F24F 13/222 |
| 2020/0061532 A1 | 2/2020 | Yoon et al. | |

OTHER PUBLICATIONS

Innovative Dehumidifiers, Tankless Dehumidification System Independent of HVAC, Retrieved from: https://www.innovativedehumidifiers.com/dehumidification-system/, 9 pages, Retrieved on: Mar. 23, 2021.

* cited by examiner

DEHUMIDIFIER WITHOUT CONDENSATE TANK

BACKGROUND

The present embodiments relate to a dehumidifier without a condensate tank.

Typical dehumidifiers include a condensate tank in a constant size and/or shape with a capacity of holding certain amount of condensate water (e.g., one gallon) generated during the dehumidification process. This may lead to problems including, but not limited to, storing, transporting, and/or shipping of a system that has a condensate tank of a large shape and/or outer dimension that undesirably increases the space needed for storage/shipping and/or increases transportation costs. Thus, there is a need for a dehumidifier without a condensate tank for purposes, such as storage, shipping, carrying, operating, etc.

SUMMARY

In some embodiments of the disclosure, for example, a dehumidifier may include a housing, a condensate water outlet, and no condensate tank. The housing may include a top wall and an opposing bottom wall interconnected by a side wall. The housing may further include at least a condenser, an evaporator, a compressor, a fan, a motor, an air inlet, and an air outlet.

In some embodiments a method of reducing the humidity of a room is discussed, comprising the steps of providing a dehumidifier without a condensate tank; configuring a condensate water outlet of the dehumidifier to be in fluid communication with a drain that is not part of the dehumidifier; and operating the dehumidifier to reduce the humidity of the room by converting water vapor in the room to condensate water, wherein the condensate water flows into the drain without passing through a condensate tank.

In some embodiments, a dehumidifier may include a housing having a top wall and an opposing bottom wall interconnected by one or more side walls. In various embodiments, the housing may include at least a condenser, an evaporator, a compressor, a fan, a motor, an air inlet, and/or an air outlet. In some embodiments, the dehumidifier may include one or more condensate water outlets. In various embodiments, the dehumidifier has no condensate tank.

In various embodiments, the one or more condensate water outlets may be positioned on the bottom wall of the housing. In some embodiments, the dehumidifier may further include a water level sensor. In various embodiments, the water level sensor may be positioned on the bottom wall of the housing. In some embodiments, the water level sensor may detect one or more condensate levels external to the housing of the dehumidifier. Moreover, in various embodiments, the bottom wall of the dehumidifier may be adapted to contact a surface having a drain therein. In some embodiments, the dehumidifier may include a pump. In various embodiments, the pump may be internal to the housing. In some embodiments, the pump may be external to the housing. In various embodiments, the dehumidifier may include a hose connection structure releasably engaging at least one of the one or more condensate water outlets. In some embodiments, the one or more condensate water outlets may be positioned on the one or more side walls of the housing.

In addition, in various embodiments, a method of reducing the humidity of a room may include the steps of providing a dehumidifier without a condensate tank. In some embodiments, the method may include configuring one or more condensate water outlets of the dehumidifier to be in fluid communication with a drain that is not part of the dehumidifier. In various embodiments, the method may include operating the dehumidifier to reduce the humidity of the room by converting water vapor in the room to condensate water, wherein the condensate water flows into the drain without passing through a condensate tank.

In various embodiments, the method may include pumping the condensate water from the dehumidifier. In some embodiments, the method may include sensing the condensate water level exterior to the dehumidifier. In various embodiments, the method may include plugging at least one of the one or more condensate water outlets. In some embodiments, the method may include releasably engaging a hose connection structure to an outer periphery of the dehumidifier. In various embodiments, the method may include dispensing condensate water away from the dehumidifier towards the drain by gravity. In some embodiments, the method may include dispensing the condensate water continuously from the dehumidifier without collection.

In addition, in some embodiments, a method of dispensing condensate away from the dehumidifier housing without collection may include the step of providing a tank-free dehumidifier having a housing. In various embodiments, the method may include configuring one or more condensate water outlets of the dehumidifier to be in fluid communication with a drain that is not part of the dehumidifier. In some embodiments, the method may include operating the dehumidifier. In various embodiments, the method may include dispensing condensate water away from the housing and into the drain when the dehumidifier is operating without passing condensate water through a condensate tank or a cavity configured to receive a condensate tank.

In various embodiments, the method may include sensing a level of the condensate water level exterior to the housing. In some embodiments, the method may include dispensing continuously from the dehumidifier during operation without the tank-free dehumidifier having the ability to collect condensate water in a condensate tank therein. In various embodiments, the method may not include removal of a condensate tank from the housing.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure.

DETAILED DESCRIPTION

Numerous variations and modifications will be apparent to one of ordinary skill in the art, as will become apparent from the description below. Therefore, the disclosure is not limited to the specific embodiments discussed herein.

The embodiments discussed hereinafter will focus on the implementation of the hereinafter-described techniques and apparatuses within a dehumidifier, such as the type that may be used in single-family or multi-family dwellings, or in other similar applications. However, it will be appreciated that the herein-described techniques may also be used in connection with other types of dehumidifying machines in some embodiments. For example, the herein-described techniques may be used in commercial applications in some embodiments.

Figure 1:
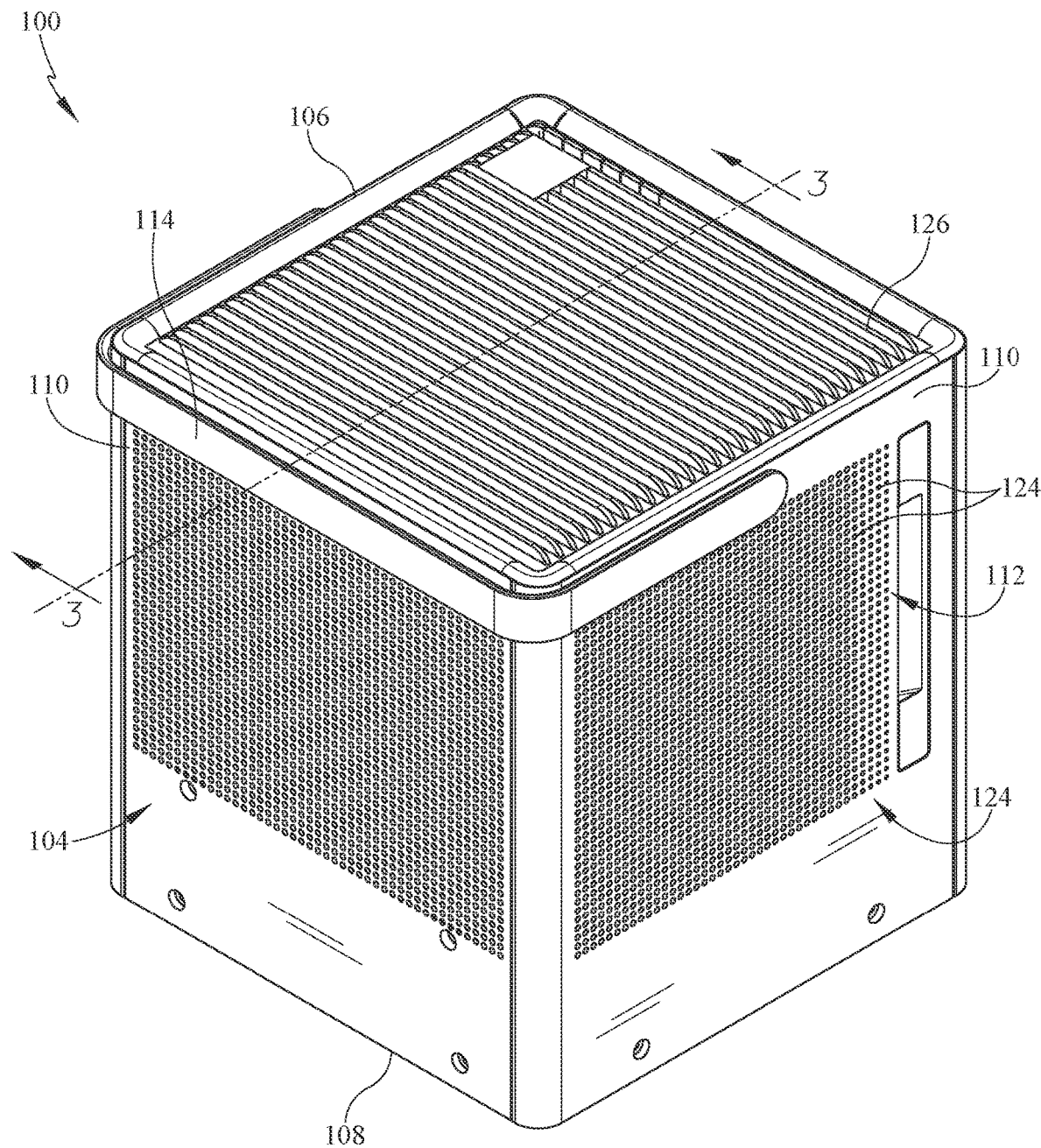
FIG. 1 is a perspective view of a dehumidifier without a condensate tank, according to an embodiment of the present disclosure.
Figure 2:
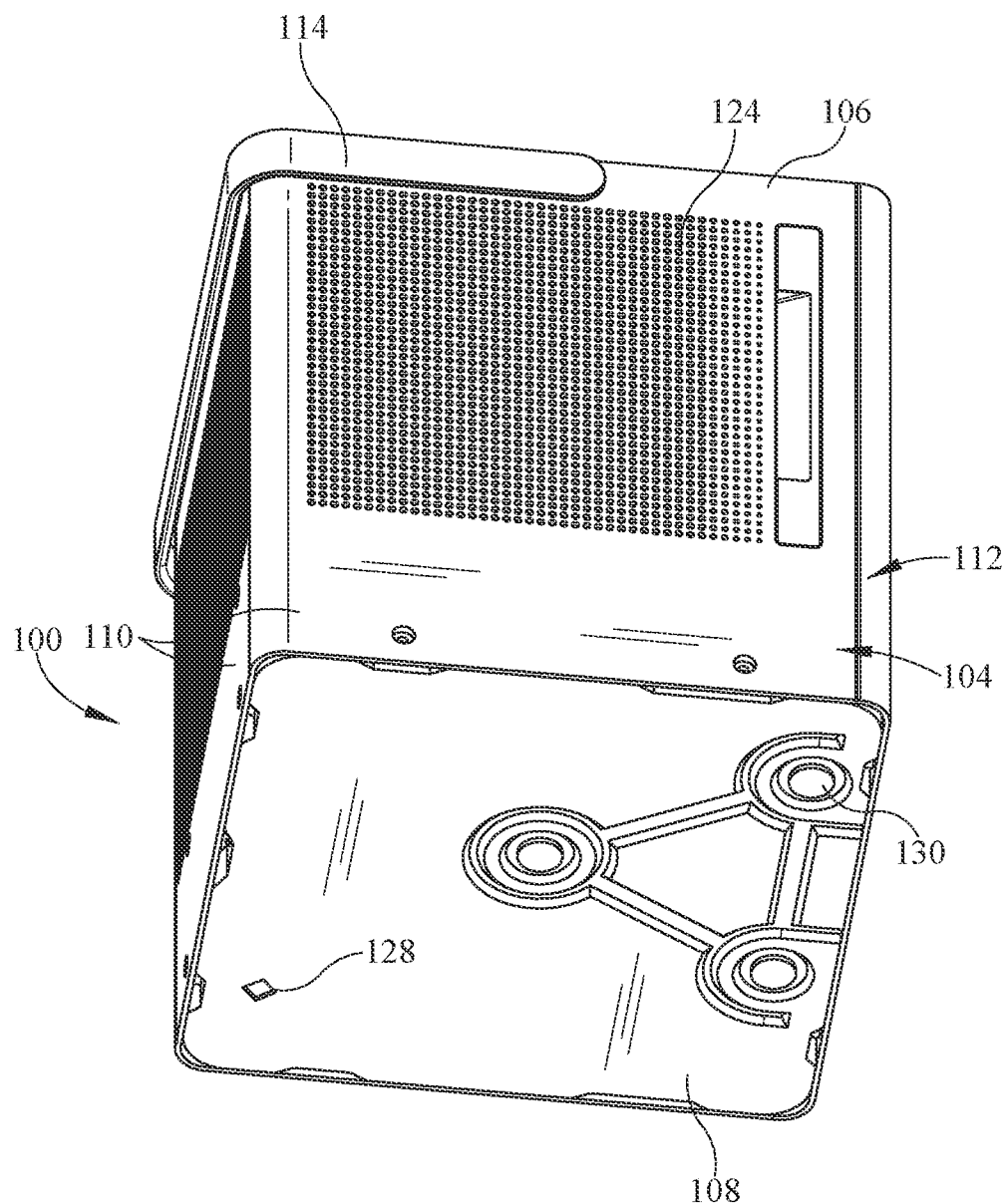
FIG. 2 is another perspective view of the dehumidifier of FIG. 1, illustrating the bottom of the dehumidifier.
Figure 3:
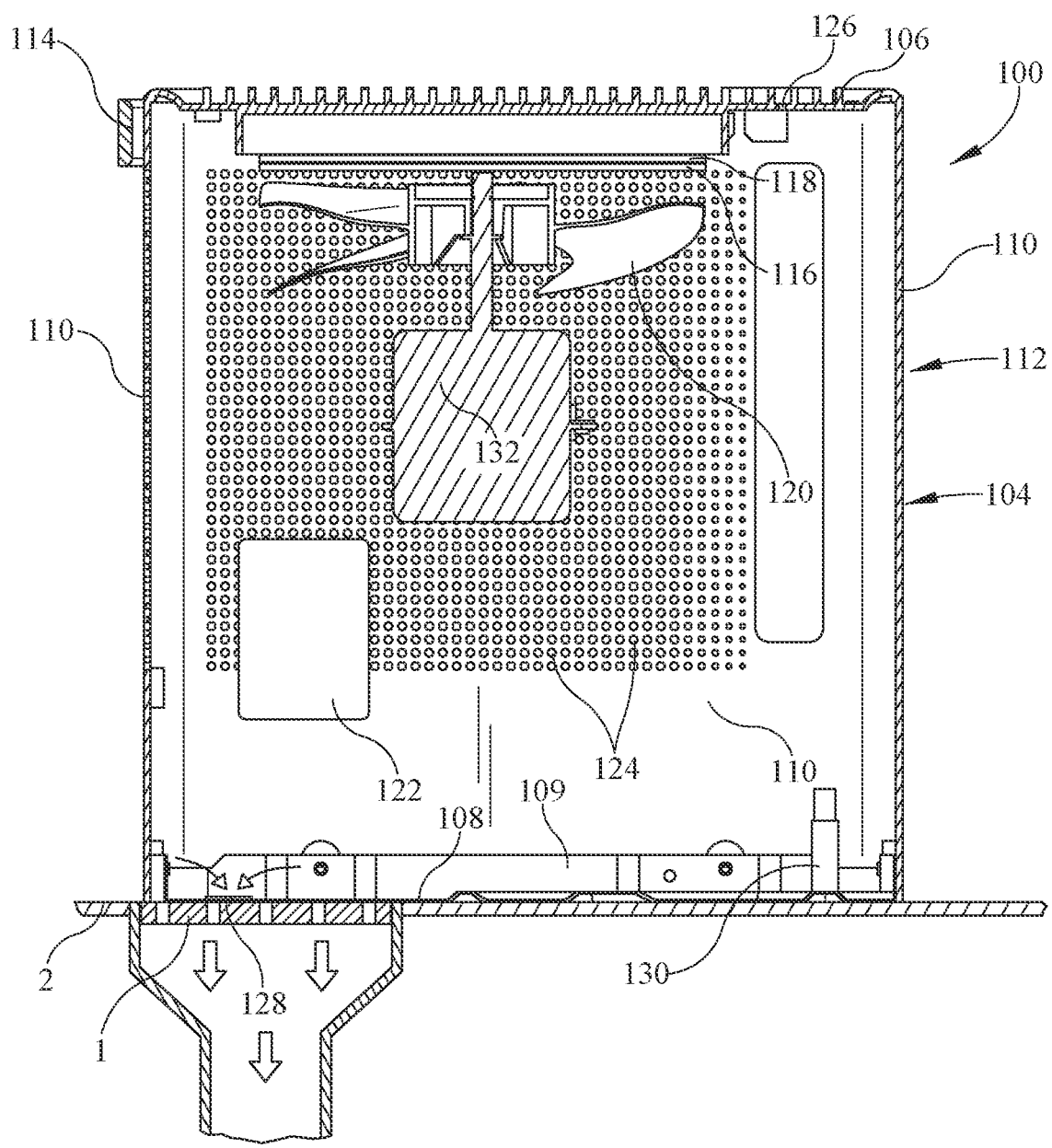
FIG. 3 is a sectional view of the dehumidifier taken along line 3-3 of FIG. 1, illustrating the components included within the dehumidifier and fluid flow to the drain of a floor.

Turning now to the drawings, wherein like numbers denote like parts throughout the several views, FIGS. 1-7 illustrate a condensing unit or a dehumidifier 100 without a condensate tank according to an embodiment of the present disclosure, in which the various technologies and techniques described herein may be implemented. The dehumidifier or housing 104 may be described as tankless or tank-free. Without a condensate tank or other similar reservoirs for collecting the condensate water, the dehumidifier 100 may more efficiently utilize a given space and provides for convenient storage, shipping, handling, operation, etc. In different embodiments, the dehumidifier 100, or portions thereof, may be a variety of shapes, sizes, quantities, and constructions and still be within the scope of the disclosure. For example, in the embodiment as shown, a housing 104 of the dehumidifier 100 may include a top wall 106 and/or an opposing bottom wall 108 interconnected by one or more side walls 110. The one or more side walls 110, top wall 106, and/or bottom wall 108 may define one or more portions of the outer periphery 112. In some embodiments as shown in FIG. 3, the dehumidifier 100 may include one or more of a condenser 116, an evaporator 118, a fan 120, a compressor 122, an air inlet 124, an air outlet 126, one or more condensate water outlets 128, a water level sensor 130, and/or a motor 132. The operations and construction of the condenser 116, the evaporator 118, the fan 120, the compressor 122, and the motor 132 are well known in the art and not described in detail herein. In some embodiments, the dehumidifier 100, or portions thereof, may also include a handle 114. The handle 114, if used, may allow the user to transport, carry, store, and/or ship dehumidifier 100, or portions thereof. During operation, the air inlet 124 and/or air outlet 126 may be uncovered and open to air flow communication through the dehumidifier 100. During operation, the dehumidifier may reduce the humidity in the room by converting water vapor in the room to condensate water. Because there is no condensate tank downstream therefrom, the condensate flows into (e.g. directly, continuously) or towards the drain 1 without passing through a condensate tank, or a condensate tank previously removed from the housing. When operating, the condensate water produced is not collected and therefore flows (e.g., continuously, directly) from the dehumidifier 100/housing 104 towards the exterior drain 1 outside the appliance or appliance body. The dehumidifier 100 does not operate around or bypass a condensate tank not within the housing 104, removed from the housing 104, and/or temporarily removed from the housing 104. With no condensate tank or elimination (e.g., removal) of a condensate tank, the user does not need to operate/bypass/manual handle a condensate tank or collect condensate fluid for later discharge.

Figure 4:
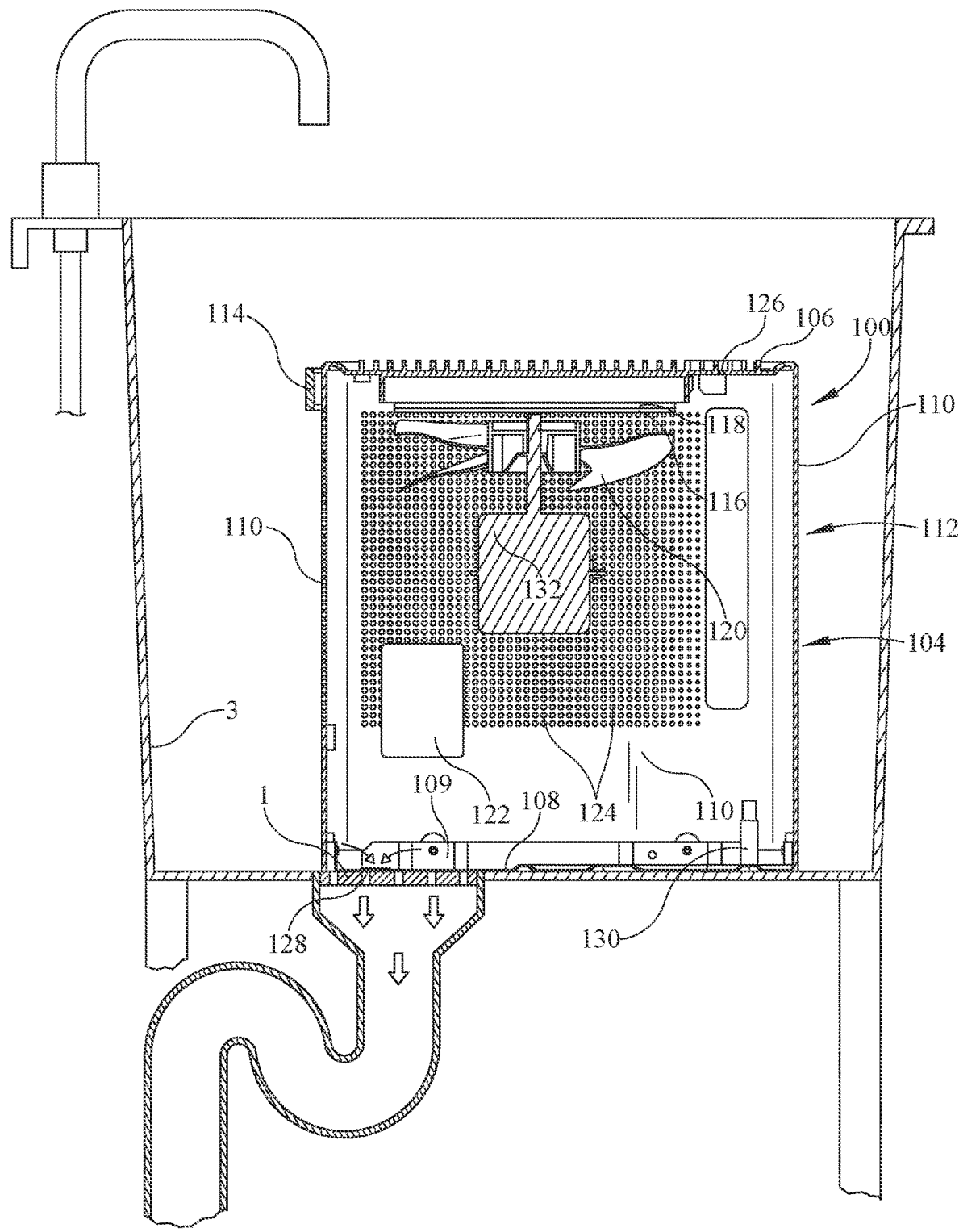
FIG. 4 is a sectional view of the dehumidifier of FIG. 1, illustrating the components included within the dehumidifier and fluid flow to the drain of a sink.
Figure 5:
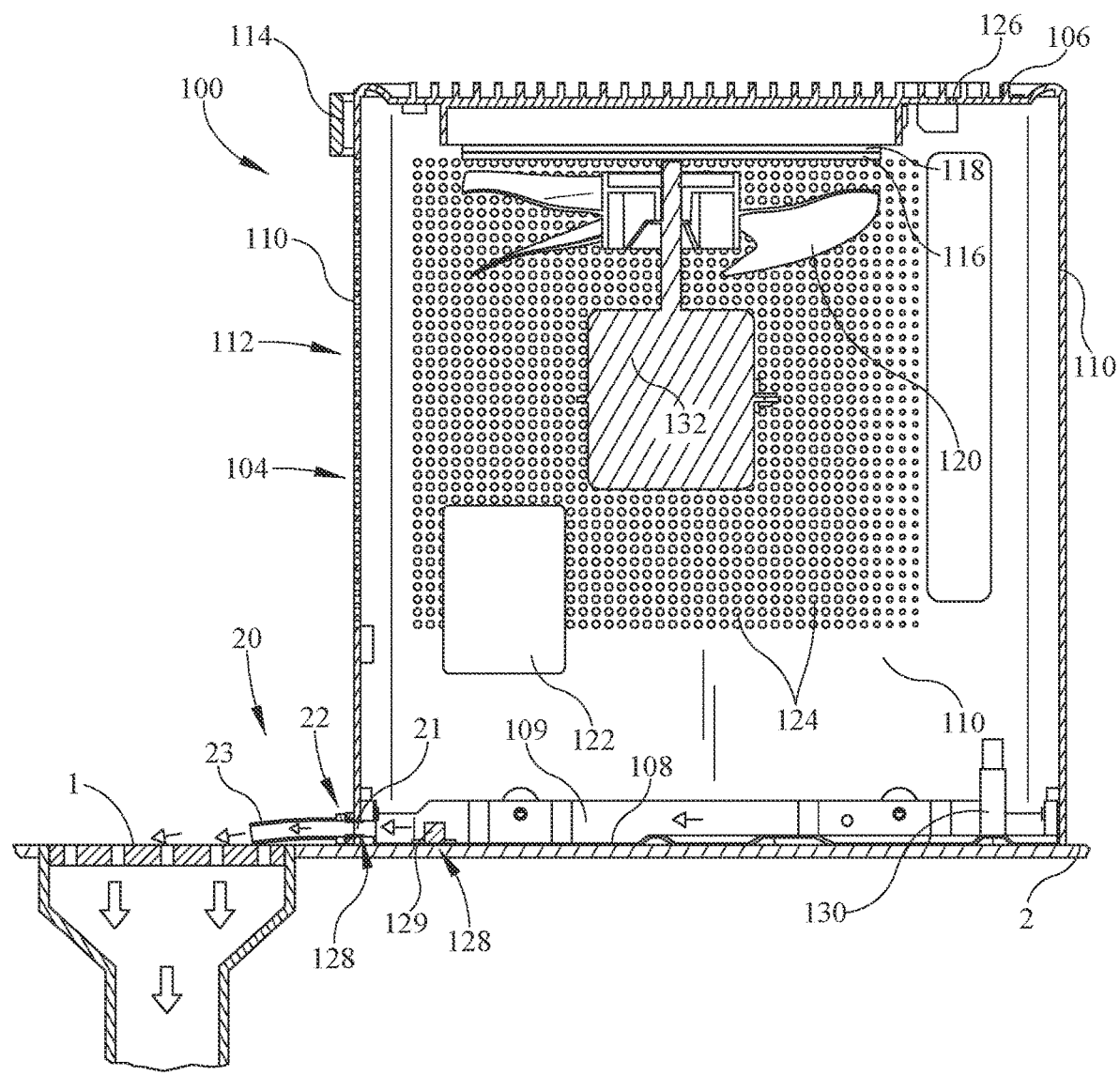
FIG. 5 is a sectional view of the dehumidifier of FIG. 1, illustrating the components included within the dehumidifier using a hose connection structure for fluid flow to the drain.
Figure 6:
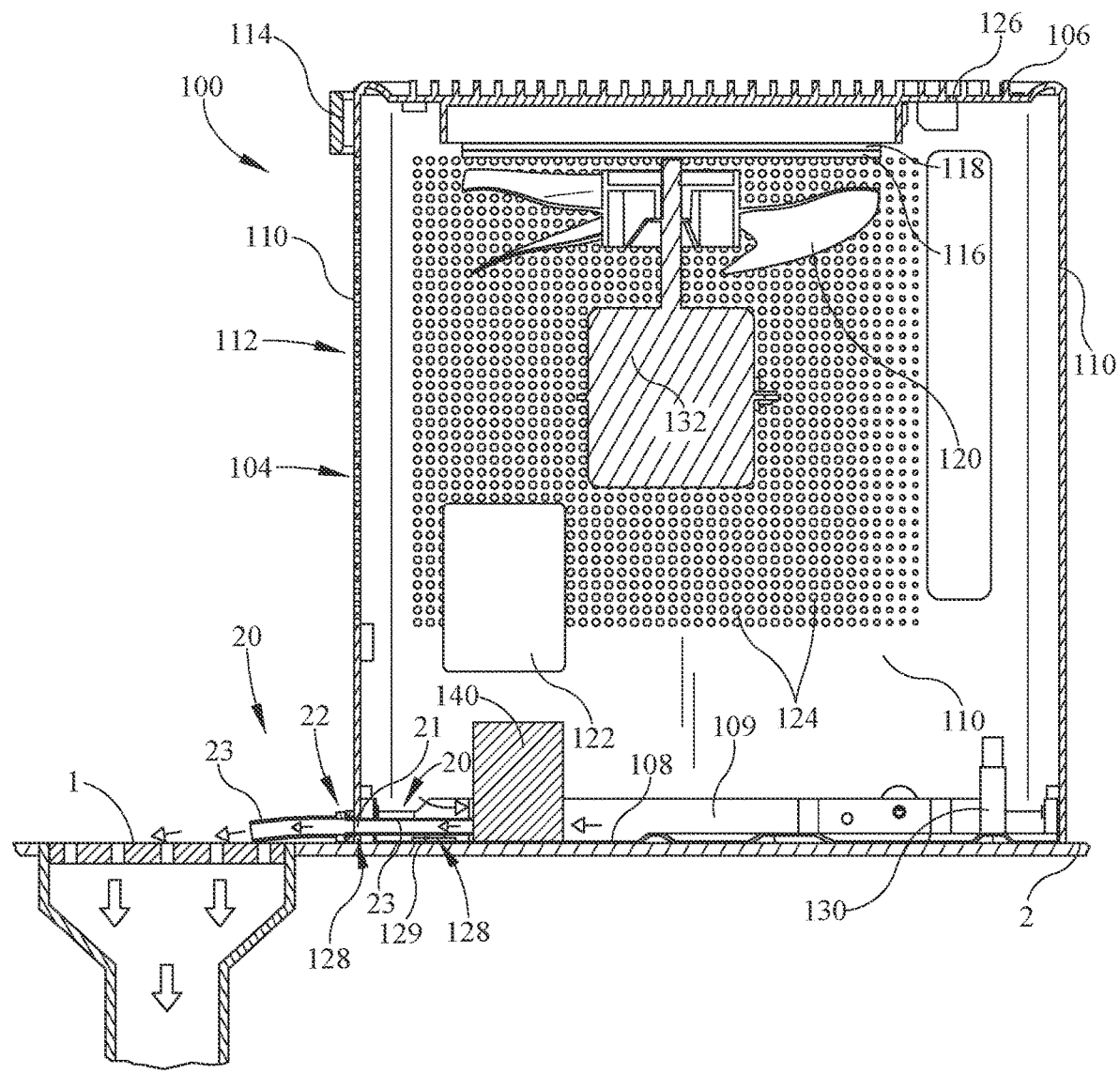
FIG. 6 is a sectional view of the dehumidifier of FIG. 1, illustrating the components included within the dehumidifier and an internal pump.
Figure 7:
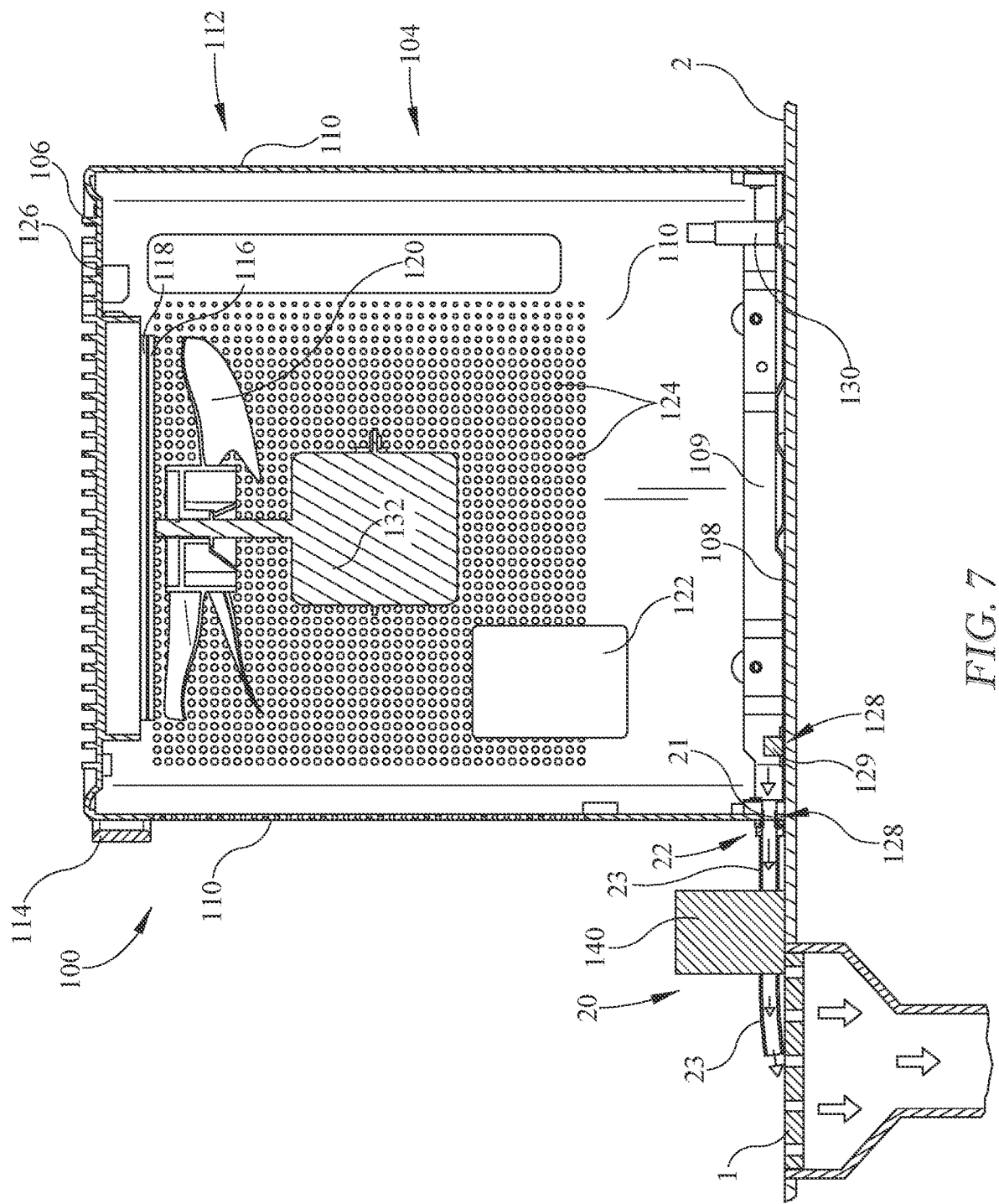
FIG. 7 is a sectional view of the dehumidifier of FIG. 1, illustrating the components included within the dehumidifier and an external pump.

In various embodiments, one or more condensate water outlets 128 may be positioned at different locations of the dehumidifier 100 to direct the condensate water generated from the moisture in the air to a drainage system. For example, in some embodiments, the dehumidifier 100 may include one or more condensate water outlets 128 on the bottom wall 108, as shown in FIGS. 2-4, to allow the condensate water to flow directly from the dehumidifier 100 into a building drainage system (e.g., a drain 1 within a floor 2, drain 1 of sink 3, etc.). In various embodiments, the dehumidifier 100 may include one or more condensate water outlets 128 on the side wall 110, such as a through opening 21 as shown in FIGS. 5-7, to allow the condensate water to flow directly from the dehumidifier 100 into a building drainage system (e.g., a drain 1 within a floor 2, drain 1 of sink 3, etc.). In such embodiments, during operation, the dehumidifier 100 may be configured to be above/lateral of a floor drain 1(See FIG. 3), within a utility sink 3 and above/lateral of the drain 1 (See FIG. 4), or something similar. The bottom wall 108 of the dehumidifier 100 may be the base/bottom of the dehumidifier 100/housing 104 adjacent to or contacting the ground/floor 2/sink 3/surface, allowing the condensate water produced in the dehumidifier 100 (e.g. drip pan 109) to drain directly, without a storage/condensate tank or being collected, into the floor drain 1 and/or the sink drain 1 by gravity/pump.

In some other embodiments, the dehumidifier 100, or portions thereof, may include one or more hose connection structures 20, and the hose connection structure (e.g. adaptors, fittings, gravity fed hose connection, etc.) may connect to a drainage system (e.g., drain 1). In various embodiments, the hose connection structure 20, if used, may be positioned inside and/or outside of the dehumidifier 100. For example as shown in FIGS. 5-7, the side wall 110 of the dehumidifier 100 may include a condensate water outlet 128 (e.g. through opening 21), alone or in combination with the condensate water outlet 128 on the bottom wall 108. The through opening 21 may releasably engage one or more drainage pipes/hoses 23, or portions thereof, of a hose connection structure 20 positioned inside/outside of the dehumidifier 100. Further, the hose connection structure 20 may include a connector 22 (e.g., male-female connector) releasably securing a downstream hose 23 and/or upstream hose to fluidly communicate with the drain 1. In some embodiments, when the hose connection structure 20 or through opening 21, if used, is facilitated by the user the condensate water outlet 128 in the bottom wall 108, if used, may include a plug 129. Alternatively, the through opening 21, if used, may need to be closed by a plug 129 (not shown) in order to utilize another fluid pathway exiting the housing 104 such as, but is not limited to, the condensate water outlet 128 (e.g., within the bottom wall 108) with or without a hose connection structure, or portion thereof. In other embodiments not shown, the dehumidifier 100 may be adapted to connect the condensate water outlet 128 within the bottom wall 108 to the drainage system (e.g. drain 1) via the hose connection structure 20, or portions thereof (e.g., a drainage pipe or hose 23, connector 22, etc.). In such embodiments where a hose connection structure 20 is used, the user may remove the dehumidifier 100 from the hose connection structure 20 (e.g., connector 22) and/or condensate water outlet 128 once the dehumidification process is over, and the dehumidifier 100 is desired to be stored and/or transported.

In some embodiments, the dehumidifier 100, or portions thereof, may also include one or more condensate water level sensors 130 to determine the percentage/level of the condensate water. The one or more water level sensors 130 may include a sonar, optical, electromechanical, mechanical, electrical, and/or float. The one or more water level sensors 130 may detect the level of condensate external (e.g., sink, surrounding floor, surrounding surface, surrounding environment, etc.) to the tankless dehumidifier or appliance. The water level sensor 130, if used, may notify the user of the level of the condensate water accumulated in a sink 3 or alert the user of the potential blockage of a drain 1 and/or the sink 3. For example, when a sink 3 is filled to a level signaled by one or more water level sensors 130 during operation, if any, the user may be notified to remove the dehumidifier 100 from the sink 1 and/or remove the blockage.

In some embodiments, the dehumidifier 100 may include one or more condensate pumps 140 to facilitate the condensate water drainage to a disposal location when gravity drainage is not possible. However, the pumps 140, if used, may still be used in combination with gravity drainage in some embodiments. The pump 104 may operate as needed and/or for a duration to dispense/pump condensate water from the housing 104 or drip pan 109. The condensate pump 140, if used, may be internal and/or external to the housing 104. The pump 140 may be in fluid communication with the hose connection structure 20 (e.g., inside and/or outside) of the housing 104, the condensate water outlet(s) 128 (e.g., in the bottom wall and/or side wall), and/or the opening 21. In some implementations as shown in FIG. 6, the dehumidifier 100 may include a built-in or internal condensate pump 140 positioned within the housing 104 (e.g. drip pan 109). The pump 140 may be fluidly connected to the inside hose connection structure 20, hose 23, through opening 21/condensate water outlet 128, connector 22, and/or the outside hose connection structure or hose 23 before directly communicating with the downstream drain 1. In other implementations as shown in FIG. 7, the dehumidifier 100 may include an external condensate pump 140 outside or external to the housing 104. The outside pump 140 may be in downstream communication from the opening 21/condensate water outlet 128, hose 23, connector 22, and/or hose connection structure 20, or portions thereof, to dispense to or towards the downstream drain 1. The pump, if used, may facilitate the condensate removal by a variety of methods or structure and still be within the scope of the invention.

In use, the user may position the dehumidifier 100 adjacent to or on top of the drain 1. Although other applications are contemplated, the drain 1 may be in a sink 3 or floor 2 in some embodiments. In operation, the condensate water may flow directly from the dehumidifier without collecting within a tank and/or through a cavity previously containing a removed tank. Because there is no condensate tank present, the user does not have to remove/eliminate a condensate tank from the housing to operate the dehumidifier. Moreover, the user does not have to dump or empty the dehumidifier because no tank is used. The housing 104 may drain by gravity and/or be pumped to/towards the drain. In some implementations, the pump 140, if used, may be internal to the housing. In some embodiments, the pump 140, if used, may be external to the housing and releasably connected in fluid communication to the dehumidifier 100/housing 104, or portions thereof. In some embodiments, the user may be able to place the dehumidifier 100 away from the drain 1 or application. The user may use a hose connection structure 20, or portions thereof, (e.g. hose, connector, etc.) to gravity feed and/or pump the condensate to/towards the drain 1. The pump 140 and/or hose connection structure 20, or portions thereof, may allow the dehumidifier 100 to be spaced away from the drain 1 and still allow direct and/or continuous drainage during one or more operation cycles. The hose connection structure 20 and/or external pump 140 may be releasably attached to the outer periphery 112 and/or one or more housing wall apertures (e.g. through opening 21, condensate water outlet 128) of the housing to use and/or store one or more portions of the hose connection structure. One or more plugs 129, if used, may be used by the user to select one or more apertures (e.g. opening 21, condensate water outlet 128) within the outer periphery 112 to be in fluid communication with the drain 1 or for one or more applications.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or"

should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The disclosure is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the disclosure has been presented for purposes of illustration. It is not intended to be exhaustive or to limit the disclosure to the precise steps and/or forms disclosed, and obviously many modifications and variations are possible in light of the above teaching.

The invention claimed is:

1. A dehumidifier comprising:
a housing having a top wall and an opposing bottom wall interconnected by one or more side walls, wherein the housing includes at least a condenser, an evaporator, a compressor, a fan, a motor, an air inlet, and an air outlet;
wherein the housing includes a first condensate water outlet and a second condensate water outlet, wherein the first condensate water outlet and/or the second condensate water outlet is positioned in at least one of the one or more side walls and/or the bottom wall, wherein at least one of the first condensate water outlet and/or the second condensate water outlet is positioned in the bottom wall of the housing; and
no condensate tank.

2. The dehumidifier of claim 1 further comprising a water level sensor.

3. The dehumidifier of claim 2 wherein the water level sensor is positioned in the bottom wall of the housing.

4. The dehumidifier of claim 2 wherein the water level sensor detects one or more condensate levels external to the housing of the dehumidifier at the bottom wall of the housing.

5. The dehumidifier of claim 1 wherein the bottom wall of the dehumidifier is adapted to contact a surface having a drain therein.

6. The dehumidifier of claim 1 further comprising a pump.

7. The dehumidifier of claim 6 wherein the pump is internal to the housing.

8. The dehumidifier of claim 6 wherein the pump is external to the housing.

9. The dehumidifier of claim 1 further comprising a hose connection structure releasably engaging at least one of the first condensate water outlet and/or the second condensate water outlet.

10. The dehumidifier of claim 1 wherein the first condensate water outlet is positioned in the one or more side walls of the housing and the second condensate water outlet is positioned in the bottom wall of the housing.

11. A method of reducing the humidity of a room, comprising the steps of:
providing a dehumidifier without a condensate tank;
configuring one or more condensate water outlets of the dehumidifier to be in fluid communication with a drain that is not part of the dehumidifier;
operating the dehumidifier to reduce the humidity of the room by converting water vapor in the room to condensate water, wherein the condensate water flows into the drain without passing through a condensate tank; and plugging at least one of the one or more condensate water outlets.

12. The method of claim 11 further comprising the step of pumping the condensate water from the dehumidifier.

13. The method of claim 11 wherein the dehumidifier includes a housing, wherein the housing of the dehumidifier includes a bottom wall, and further comprising the step of sensing the condensate water level exterior to the dehumidifier at the bottom wall of the housing.

14. The method of claim 11 further comprising the step of releasably engaging a hose connection structure to an outer periphery of the dehumidifier.

15. The method of claim 13 wherein the bottom wall of the housing includes a water sensor, and further comprising the step of dispensing condensate water away from the water sensor towards the drain by gravity.

16. The method of claim 11 further comprising the step of dispensing the condensate water continuously from the dehumidifier without collection.

17. A method of dispensing condensate away from a dehumidifier housing without collection comprising the steps of:

providing a tank-free dehumidifier having a housing, wherein the housing includes a bottom wall, and wherein the bottom wall includes a water sensor positioned therein;

configuring one or more condensate water outlets of the dehumidifier to be in fluid communication with a drain that is not part of the dehumidifier;

operating the dehumidifier; and dispensing condensate water away from the water sensor and into the drain when the dehumidifier is operating without passing condensate water through a condensate tank or a cavity configured to receive a condensate tank.

18. The method of claim 17 further comprising the step of sensing a level of the condensate water exterior to the housing at the bottom wall.

19. The method of claim 17 further comprising the step of dispensing continuously from the dehumidifier during operation without the tank-free dehumidifier having the ability to collect condensate water in a condensate tank therein.

20. The method of claim 17, wherein the method does not include a step of removal of a condensate tank from the housing.

* * * * *